(12) United States Patent
Schmidt

(10) Patent No.: US 6,286,652 B1
(45) Date of Patent: Sep. 11, 2001

(54) ROLLER CONVEYOR TRACK, AND ROLLER CHAIN FOR SAME

(75) Inventor: Heinz W. Schmidt, Stuttgart (DE)

(73) Assignee: Mannesmann A.G., Dusseldorf (DE)

( * ) Notice: Subject to any disclaimer, the term of this patent is extended or adjusted under 35 U.S.C. 154(b) by 0 days.

(21) Appl. No.: 09/396,620

(22) Filed: Sep. 15, 1999

(30) Foreign Application Priority Data

Sep. 22, 1998 (DE) .............................. 198 45 781

(51) Int. Cl.[7] ................................................. B65G 13/00
(52) U.S. Cl. ...................................... 193/35 R; 198/861.1
(58) Field of Search .................................. 198/780, 782, 198/781.01, 817, 861.1; 193/35 R, 37

(56) References Cited

U.S. PATENT DOCUMENTS

| | | | |
|---|---|---|---|
| 3,653,489 | 4/1972 | Tullis et al. ...................... | 198/110 |
| 3,944,037 | 3/1976 | Stease ................................ | 196/35 |
| 4,930,623 | * 6/1990 | Johnson et al. ................. | 198/861.1 X |
| 5,328,020 | * 7/1994 | Clopton ........................... | 198/861.1 X |
| 5,788,056 | * 8/1998 | Clopton ........................... | 198/861.1 X |

FOREIGN PATENT DOCUMENTS

| | | |
|---|---|---|
| 3432042A1 | 3/1986 | (DE) . |
| 0368807A1 | 5/1990 | (EP) . |
| 0827922A1 | 3/1998 | (EP) . |
| 58188210 | 2/1983 | (JP) . |

\* cited by examiner

*Primary Examiner*—James R. Bidwell
(74) *Attorney, Agent, or Firm*—Van Dyke, Gardner, Linn & Burkhart, LLP

(57) ABSTRACT

The invention refers to a conveyor track with rollers for transport goods—in particular to a track with small-diameter rollers for workpiece carriers—provided, seen in the conveying direction, with multiple, consecutively arranged, braced support rollers which are a component of a side bar and bolt-equipped roller chain, whose bolts jut out sideways over the side bars and on which conveyor track support elements that proceed in the conveying direction are supported, and where the support rollers jut out over the side bars and the support elements in the direction of the transport goods. In order to create a conveyor track with transporter rollers, in particular a track with small-diameter rollers for workpiece carriers, as well as a roller chain which—basically—allows a constructural simplification of the roller placement in the conveyor track, it is proposed that the bolts of the roller chain be supported directly by the support element or directly via intermediate elements placed on the support element.

25 Claims, 2 Drawing Sheets

ROLLER CONVEYOR TRACK, AND ROLLER CHAIN FOR SAME

TECHNICAL FIELD AND BACKGROUND OF THE INVENTION

The invention refers to a roller conveyor track, in particular for a track with small-diameter rollers for work piece carriers, as well as a roller chain for a roller conveyor track.

A skate wheel conveyor, i.e. a roller conveyor track for low-weight loads is known from the German company publication of the Mannesmann Dematic AG, Wetter, bearing the title "Demag—Modular Concept Transfer System (DTS [MCTS]) (see edition of 01/1997, page 17). Essentially, this conveyor track with small-diameter rollers consists of two parallel, spatially separated support elements that extend in the conveying direction, and from which the goods units—preferably work piece carriers for the assembly operation—can be conveyed and supported at their respective lateral lower surfaces. For that purpose, the extruded aluminum sections are provided—seen in cross section—with an upper and lower hollow space, both extending in the conveying direction. The upper hollow space is provided with a slot-like, longitudinal aperture in the conveying direction, inside and along which extend the support rollers of the skate wheel conveyor track, that are placed in the hollow space in direction of the goods units. In order to simplify the assembly, the support rollers are not individually installed in the support elements, but are components of a so called roller accumulator chain, which—seen in the conveying direction—shows multiple support rollers that are consecutively but separately arranged, such as are normally utilized in roller accumulation chain conveyors. In order to mount the support rollers, the roller chain is inserted into the upper hollow space and, in order to prevent it from slipping inside the support element, it is fixed—pointing upstream viewed in the conveying direction—at the beginning of the support element via a bolt. Thereby, the support rollers of the chain and, thus, the support rollers of the conveyor track rest on the bolts of the roller accumulator chain as well as between its side bars. Since a roller accumulator chain is used for the conveyor track that is described here, same clearly shows extended bolts that jut out laterally from the chain's side bar upon which the respective track rollers rest. The track rollers are supported by the lower part of the upper hollow space in this manner to achieve free tunability of the track rollers. In one special design, one of the two support elements can be provided with a small-diameter roller track with inserted roller accumulator chain, and the other support element can be provided with a driven, continuous flat belt, which allows the transported goods to be moved on the conveyor track.

Especially in the case of conveyors of this design it may happen that—due to the headroom of the roller accumulator chain—the flat belt will have to be lifted by additional means in order to be able to convey the transported goods horizontally. For this purpose, for instance plastic, ledge-shaped sections are attached to the upper surface of the support elements on which the conveyor belt then proceeds.

The previously described roller accumulator chains that are utilized for this type of roller conveyors are described as components of conveyors with roller accumulator chain, such as referred to, for instance, in the German disclosure publication DE 34 32 042 A1, showing support rollers that serve to accept the transported goods, and which rest both on the chain's bolts as well as between the side bars. The chain pitch is selected to let the rollers turn freely. In the case of conveyors with roller accumulator chains, the continuous chains are arranged and supported by the support elements via track rollers. The track rollers rest on the respective bolts of the chain, which—for this purpose—have been lengthened in order to jut out from the side bars on both sides.

In connection with the previously described roller conveyor tracks that use continuously cast aluminum sections with upper and lower hollow spaces, these sections can also be utilized as support elements for conveyors with roller accumulator chains (see page 16 of the previously mentioned German company publication of the Mannesmann Dematic AG), and serve to return the lower strand of the roller accumulator chain to the lower hollow part of the support element.

SUMMARY OF THE INVENTION

The object of the present invention is to create a conveyor track with rollers for goods transport, particularly a small-diameter roller track for workpiece carriers, as well as a roller chain for being used especially in roller conveyor tracks, which—basically—will allow a constructural simplification of the roller placement in the conveyor track and of the roller chain.

Regarding a roller conveyor track, this end is achieved by means of characteristics, such as providing a pair of support elements extending in a conveying direction and a bolt equipped roller chain having a plurality of side bars and a plurality of bolts extending outwardly through the side bars, with each of the bolts supporting a support roller for supporting workpiece carriers. The bolts are supported by respective support elements of the pair of support elements, with the support rollers projecting above the side bars and the respective support element toward the workpiece carriers. The bolts are supported by intermediate elements on the respective support element.

In one aspect, each of the support elements includes a hollow space extending in the conveying direction along a longitudinal direction of the support elements. The hollow space includes a side facing the transport goods. The side includes a slot-shaped opening that also extends in the conveying direction. The intermediate elements are ledge-shaped and are inserted in recesses which extend into a lower side of the hollow space in a conveying direction.

In a further aspect, two recesses are arranged in a lower of the hollow space for intermediate elements whose distance from each other is chosen in such a way that the intermediate elements support the bolts that jut out on both sides of the side bars. Optionally, an additional groove between the recesses may be provided and into which the support rollers plunge while maintaining a clearance. In addition, the intermediate elements may comprise polyethylene.

In another aspect, one roller chain is coupled to one end of the support element by means of an adapter sleeve which is placed at right angles to the conveying direction.

According to yet another aspect, the conveyor track has two parallel running support elements, which extend in the conveying direction and are spatially separated by transverse supports. The support elements lend lateral support to the transport goods.

According to another aspect, another support element of the support elements supports a continuous flat belt whose transports goods carrying strand proceeds on a ledge-shaped part. The part is mounted on another support element and covers an aperture in the other support element. The lower strand of the flat belt is guided back into a hollow space of the other support element.

In yet another aspect, the side bars are interconnected by bolts. The support rollers jut out from the side bars, with the bolts for directly supporting the roller chain via the bolt on a respective support element and being laterally extended on both sides of the side bars.

In another form of the invention, a roller conveyor track includes a pair of support elements extending in a conveying direction and a bolt equipped roller chain. The bolt equipped roller chain has a plurality of side bars and a plurality of bolts extending outwardly through the side bars, with each of the bolts supporting a support roller for supporting workpiece carriers. The bolts are supported by a respective support element of the pair of support elements, with the support rollers projecting above the side bars in the respective support element toward the work piece carriers. The bolts are supported by the respective support element.

In one aspect, each of the support elements includes a hollow space extending in a conveying direction along a longitudinal direction of the support elements. The hollow space includes a side facing the transport goods. The side has a slot-shaped opening that also extends in the conveying direction.

Advantageous further developments of the invention include a roller chain that includes a plurality of bolts, pairs of side bars which are interconnected by a respective bolt of the plurality of bolts, and support rollers which are supported by the bolts. The rollers jut out from the side bars, with the bolts for directly supporting the roller chain via the bolts on a respective support element of the roller conveyor track and being laterally extended on both sides of the side bars.

In one aspect, the support rollers are positioned on the bolts between the side bars.

As per the invention, the utilization of intermediate elements (whose thickness may be varied slightly) and which are inserted at the bottom of an upper hollow space of a conveyor tract's support element, can provide the option to use a commercially available roller accumulation chain which does not have the commonly used track rollers. Thus, the ensuing advantage is the direct support of the roller chain's bolts at the bottom of the support element's hollow space or, respectively, on the intermediate elements placed on it. Due to the option of using the dimensions of the intermediate elements placed at the bottom of the support element, it is possible to adjust how far upwards the carrier rollers are to jut out from the upper aperture of the support element's hollow space. Polyethylene (PE) has been found to be an especially advantageous material for the intermediate elements.

When the bottom of the upper hollow space is developed correspondingly, it will also be possible to directly support the bolts. In this case, however, the adjustability via the intermediate elements is lost. Basically, an especially simple execution of a roller conveyor and roller chain is achieved, since an additional arrangement of the support rollers on the bolts—such as in the case of known roller accumulation chains—is omitted. At the same time, the known advantages of the roller accumulator chain remain, namely the freely turning support roller.

Furthermore, it is advantageous that recesses for the intermediate elements are placed at the bottom of the upper hollow space, and that an additional groove for the intermediate elements is provided between the recesses into which the support rollers can plunge while maintaining a clearance and, thus, their turnability. In order to ensure the flawless support of the roller chain by means of the bolts jutting out, bilaterally, from the side bars, the bottom of the hollow space has been provided with two parallel, spatially separated recesses for the intermediate elements. The distance between the recesses has been selected in such a way that the roller chain's bolts can be securely supported by the intermediate elements.

It has found to be of special advantage that now, due to the greater range to adjust the extent to which the support rollers protrude from the upper surface of the support element, it is very easy to combine different types of conveyor tracks, such as for instance roller conveyors and belt conveyors. Thus, in the case of a conveyor track with two parallel running support elements and with different conveying means such as rollers or belts, it is easy to compensate for the differing headrooms of the conveying means being used.

Preferably, the support elements are designed to be separated from each other by means of transverse supports, and that one carrier element is designed in the form of a roller conveyor, and the other as a belt conveyor. To be able to use the standardized carrier element that accepts and supports a flat belt is very easily achieved by inserting a ledge-shaped part into the opening of carrier element's upper hollow space. The flat belt will then proceed in the ledge-shaped molded parts. It is advantageous that the roller chain, with its carrier rollers protruding from the aperture on the opposite support, can be lowered further than is feasible with the customary roller accumulator chain, due to the capability of selecting the intermediate elements' height; this results in the carrier rollers lying flush—on a common horizontal conveying plane—with the flat belt's upper surface. Thus, to a large extent, the transported goods—especially pallet-type workpiece carriers—can be conveyed horizontally.

Furthermore, the present invention provides a roller chain, particularly for use in roller conveyor tracks that have bolts which are interconnected via side bars, as well as support rollers which rest on the bolts and support rollers that extend beyond the side bars. The roller chain is very simple in its construction since the track roller arrangement can be omitted. It is advantageous to extend the bolts laterally from the side bars in order to have them supported directly by a structural element.

The invention is explained below in more detail, using an execution example shown in a drawing. Shown in:

DETAILED DESCRIPTION OF THE PREFERRED EMBODIMENTS

Figure 2:
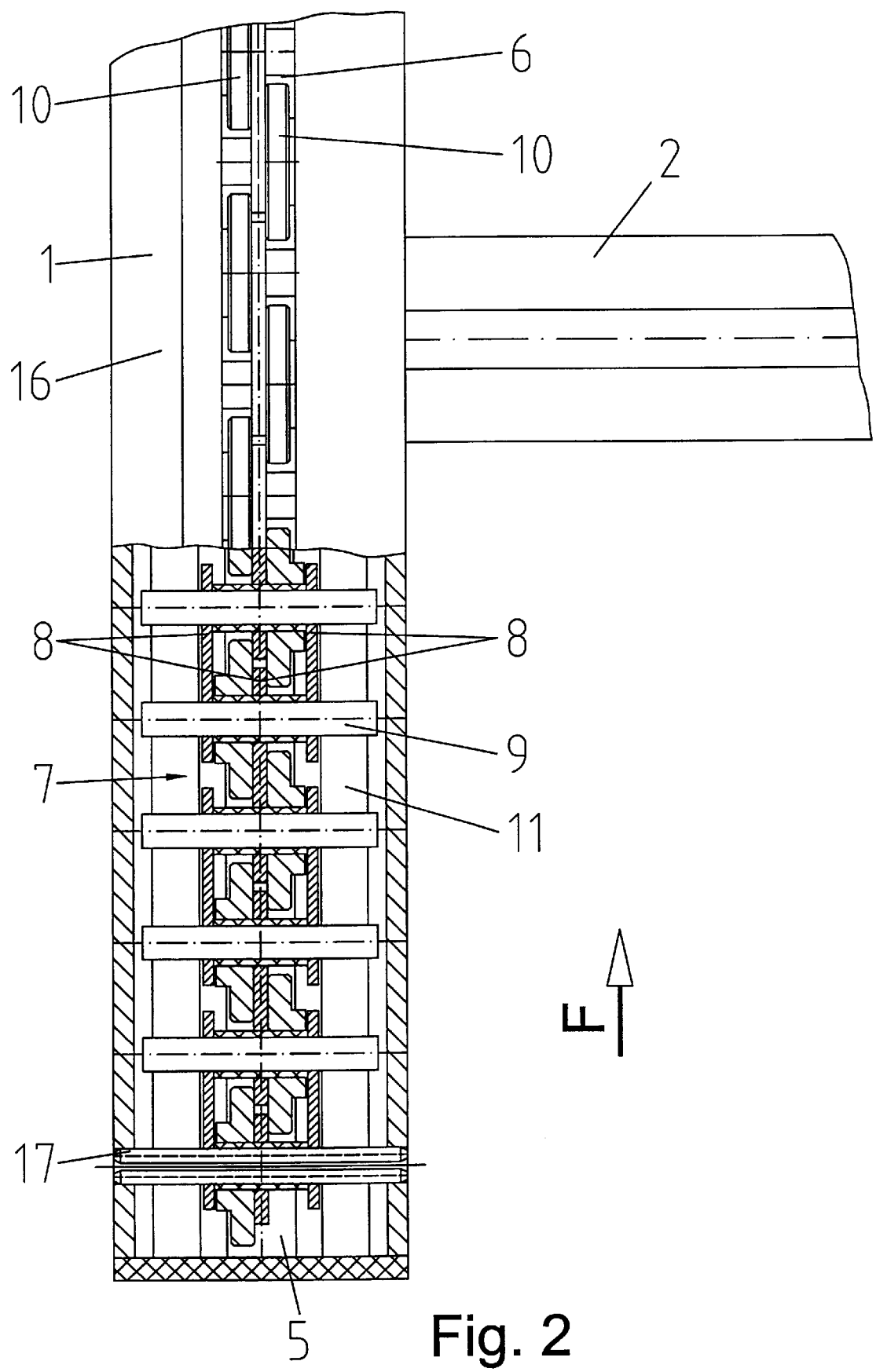

The conveyor track shown in the execution example consists, essentially, of two parallel support elements 1, that extend in the conveying direction F (see FIG. 2). These support elements 1 are spaced as well as interconnected by a transverse support 2. The support elements 1 or, respectively, the transverse supports 2 are held to the floor by a bracket (not shown) or held via a suspension frame.

Figure 1:
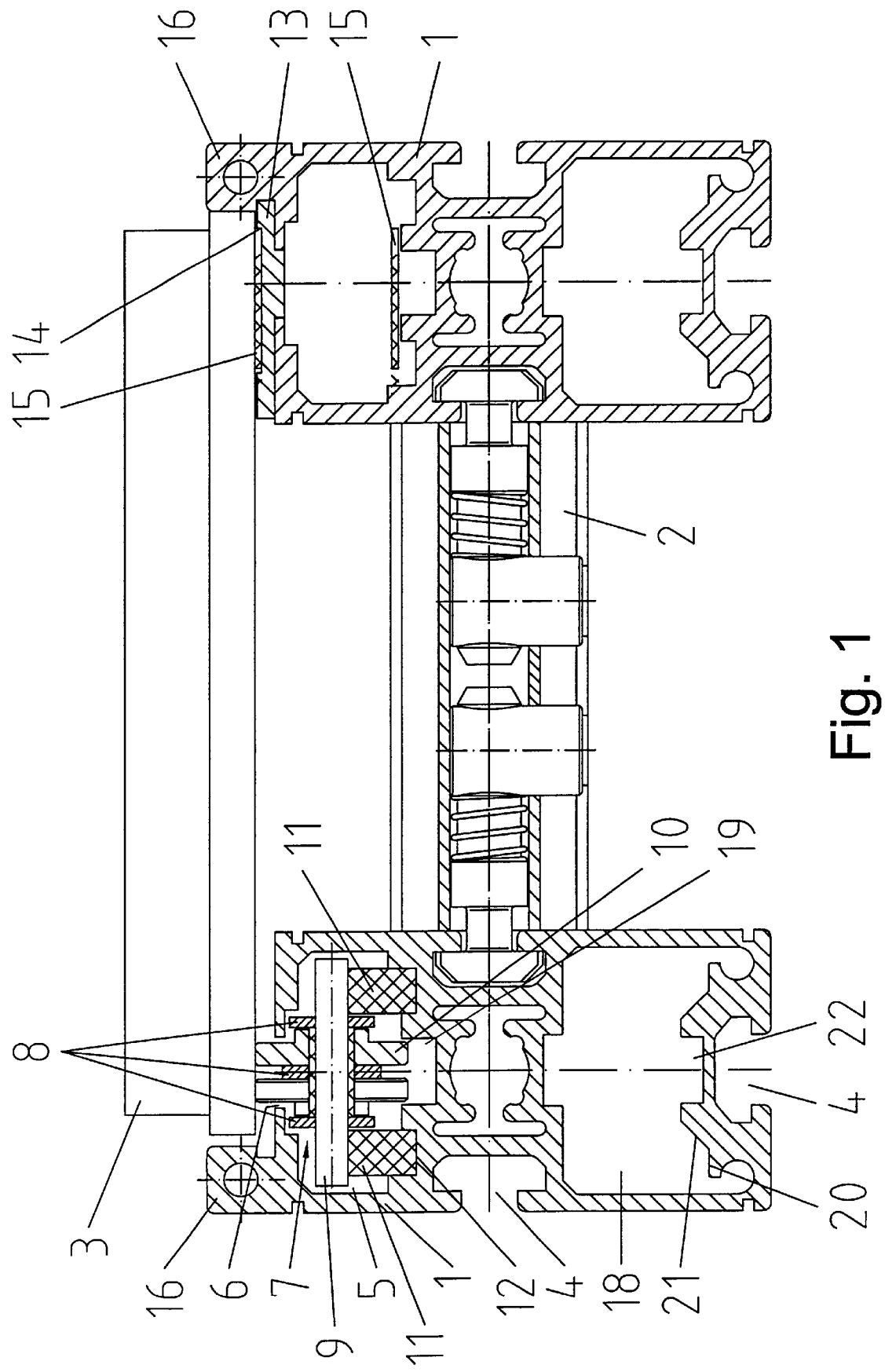
FIG. 1 a cross-cut view of a roller track, at right angles to the conveying direction, and FIG. 2 a top view of a longitudinal conveyor track support, shown partly as a sectional elevation.

FIG. 1 shows a view of the support elements 1 and a transverse support 2 of the conveyor track in a cross-cut at right angles to the conveying direction F. It can be seen that via the two support elements 1 extending in the conveying direction F, the piece goods 3 to be conveyed, especially pallet-type workpiece carriers pertaining to an assembly conveyor section are only laterally supported by the support elements 1. The transport of containers or pallets is also feasible. In that case, the support elements 1 are executed in extruded aluminum sections, each of whose lateral and bottom surfaces is provided with slot-type grooves 4. The grooves 4 have undercuts that serve to insert sliding blocks (not shown), in order to be able to connect the support elements 1 to the transverse supports or other structural elements, such as, e.g., branching support elements, covers or support struts.

Furthermore, the support element 1 has an upper hollow space 5 with an essentially square cross-cut, and which is provided with a slot-shaped aperture 6 that points upwards in the conveying direction F of the goods to be transported. A roller chain is inserted pointing in the conveying direction F—in the hollow space 5 of the left support element 1. The roller chain 7 consists, essentially, of side bars 8 which are interconnected in a customary manner via the bolts 9. The roller chain can also be executed in the form of a so-called sideways curving chain, i.e. a chain, extending in the conveying direction F, that can be laid horizontally and curving either to the left or right. In this case, the apertures in the side bars 8 are widened in order to accommodate the bolts 9. At least one support roller 10 is placed respectively on the bolts 9 and between the side bars 8 on which the transported goods 3 are rolled down. For this purpose, the outer periphery of the support rollers 10 protrudes from the support elements 1 in the area of the aperture 6. Each of the support rollers 10 is placed at a short distance from the side of the edges of the aperture 6 in the support element 1. In order to achieve that the support rollers 10 will be able to turn freely, the bolts 9—as is known from roller accumulator chains are lengthened to protrude from the side bars 8, and are braced by the support element 1 in the hollow space 5. Since the bottom of the upper hollow space 5, in accordance with the support element 1 as per the execution example, also serves to accommodate continuous roller accumulation chains, two recesses 12—viewed in the conveying direction F—have already been provided externally, opposite each other, spatially separated as well as parallel to each other. Seen in profile, the cross-cut of these recesses 12 are square. When using this support element 1 for continuous roller accumulation chain conveyors, the track rollers that rest on the bolts proceed in the recesses 12 and are guided laterally by the inner peripheral walls of the recesses 12. A further groove 19 is provided at the bottom of the hollow space 5. The carrier rollers 10 of the roller accumulation chain are moved in the conveying direction, without touching the inner walls of the groove 19. This assures the free turnability of the accumulator rollers.

FIG. 1 also shows that, in addition to the upper hollow space 5, the support element also has a square lower hollow space 18; when utilizing the support element 1 on a roller accumulation chain conveyor, same serves to return the lower strand of the roller accumulation chain. In order to be able to guide the lower strand—in particular its track rollers the bottom of the lower hollow space is provided with tracks 20 which have inwards sloping guiding areas 21. Between the tracks 20, a further groove 22 is provided once more, in order to ensure that the support roller 10 can run freely.

When utilizing the support elements 1 for a roller track as per the present invention, the support rollers 10 plunge into the groove 19, while maintaining an all-around clearance. Contrary to a roller accumulation chain, no track rollers are provided on the bolt 9 of the roller chain 7 as per the invention. In order to also ensure free turnability of the support rollers 10 of the roller chain 7, i.e. to create some clearance between the support roller's periphery and the bottom of the upper hollow space 5, intermediate elements 11 in the form of plastic ledges, preferably made of polyethylene (PE), and extending in the conveying direction, are placed in the recesses 12. This will lift the roller chain 7—which thus, for the moment, is executed with a lesser height than a roller accumulator chain—in the direction of the conveyed goods. The advantage is that by changing the height of the intermediate elements 11, the extent by which the support rollers 10 protrude upwards from the support element 11—within the preset play between the chain's side bars 8 and the upper inner wall of the hollow space 5—can be adjusted without having to modify the standardized support element 1.

When the dimensions of the support element 1 are developed correspondingly, it is also possible—in principle—to take down the bolts 9 directly to the bottom of the hollow space 5 within the support element 1 without the use of the intermediate elements 11.

The previously described adjustment option, i.e. varying the heights of the intermediate elements 11, has been found to be very advantageous when no roller track with freely turning support rollers 10 has been provided in the right-hand support element 1 that extends parallel to the previously described support element 1, but that a continuous flat belt 15 is provided instead as drive for the conveyed goods 3. For this purpose, a ledge-shaped part 13 is inserted in the upper aperture 6 of the hollow space 5 with which, on the one hand, the aperture is closed and, on the other, a square guiding track 14 for a flat belt 15 is created. Through the corresponding height adaptation of the intermediate elements 11 it is possible—in spite of the utilization of similarly executed support elements 1—to achieve a horizontal transport of the piece goods 3. If a roller accumulation chain were to be used here in accordance with the state of technology manner of execution, the result would be that the support roller 10 would not be pulled out far enough from the aperture 5 of the support element 1. The transported goods 3 would lie in an inclined position.

Furthermore, it can be seen that the lower strand of the flat belt is moving along within the upper hollow 5 and at its bottom. It cannot be seen from the drawing that the flat belt 15 is both reversed as well as driven by pulleys that are arranged at the beginning and end of the respective support elements 1. Furthermore, it can be gathered from the drawing 1, that in each case the sides of the support elements 1 are provided with a guide ledge 16 that extends in the conveying direction in order to laterally guide the piece goods 3 that are conveyed on the support rollers 10 and the flat belt 15.

A conveyor track of this type is especially suited for the transport of workpiece carriers with low-weight loads.

FIG. 2 shows a top view of a section of the left support element 1 as per drawing 2, as well as part of the transverse support connected to it. In order to give a more detailed explanation of the structure of the roller chain 7 that was used in the present case, the support element 1 is partially shown in a sectional elevation. The roller chain 7 used in the present execution example has—seen in the conveying direction F—alternately arranged support rollers 10 in order to allow that a support roller 10 can come to rest on each of the bolts 9 whose diameter is larger than the chain pitch. For this purpose—seen in conveying direction F—the support rollers are arranged on the bolt 9, alternately staggered to the right or left. In order to be able to guide the support rollers 10 in the right or left position respectively, here—contrary to a roller chain 7 with only one support roller—part of the side bars 8 on a bolt 9 are arranged inwards and staggered between the support rollers 10.

FIG. 2 also shows that—seen in the conveying direction F—the roller chain 7 that is inserted in the hollow space 5 is connected to the support element 1 via an adapter sleeve 17. Here, the adapter sleeve 17 instead of a bolt 8 was connected to side bars 8 of the roller chain 7 . A support roller 10 rests on the adapter sleeve 17 as well.

Reference list

1 Support element
2 Transverse support
3 Cconveyed goods
4 Groove
5 upper hollow space
6 Aperture
7 Roller chain
8 Side bars
9 Bolt(s)
10 Support roller
11 Intermediate elements
12 Recesses
13 Shaped part
14 Guiding track
15 Flat belt
16 Guiding ledge
17 Adapter sleeve
18 Lower hollow space
19 Groove
20 Tracks
21 Guiding areas
22 Groove
F Conveying direction

What is claimed is:

1. A roller conveyor track comprising:
   a pair of support elements extending in a conveying direction; and
   a bolt equipped roller chain having a plurality of side bars and a plurality of bolts extending outwardly through said side bars, each of said bolts supporting a support roller for supporting workpiece carriers, said bolts being supported by a respective support element of said pair of support elements, said support rollers projecting above said side bars and said respective support element toward the workpiece carriers, said bolts being supported by intermediate elements on said respective support element, and said roller chain being connected to said respective support element in order to fix said roller chain to said respective support element.

2. The roller conveyor track according to claim 1, wherein each of said support elements includes a hollow space extending in said conveying direction along a longitudinal direction of said support elements, said hollow space including a side facing the transport goods, said side having a slot-shaped opening that also extends in the conveying direction, and said intermediate elements being ledge-shaped and being inserted in recesses which extend into a lower side of said hollow space in the conveying direction.

3. The roller conveyor track according to claim 2, wherein two recesses are arranged in the lower of the hollow space for intermediate elements whose distance from each other is chosen in such a way that the intermediate elements support the bolts that jut out on both sides of the side bars.

4. The roller conveyor track according to claim 3, further comprising an additional groove between the recesses, and into which the support rollers plunge while maintaining a clearance.

5. The roller conveyor track according to claim 4, wherein said intermediate elements comprise polyethylene.

6. The roller conveyor track according to claim 1, wherein said conveyor track has two parallel running support elements which extend in the conveying direction and are spatially separated by transverse supports, and that the support elements lend lateral support to the transport goods.

7. The roller conveyor track according to claim 2, wherein said conveyor track has two parallel running support elements which extend in the conveying direction and are spatially separated by transverse supports, and that the support elements lend lateral support to the transport goods.

8. The roller conveyor track according to claim 3, wherein said conveyor track has two parallel running support elements which extend in the conveying direction and are spatially separated by transverse supports, and that the support elements lend lateral support to the transport goods.

9. A roller conveyor track comprising:
   a pair of support elements extending in a conveying direction; and
   a bolt equipped roller chain having a plurality of side bars and a plurality of bolts extending outwardly through said side bars, each of said bolts supporting a support roller for supporting workpiece carriers, said bolts being supported by a respective support element of said pair of support elements, said support rollers projecting above said side bars and said respective support element toward the workpiece carriers, said bolts being supported by intermediate elements on said respective support element, each of said support elements including a hollow space extending in said conveying direction along a longitudinal direction of said support elements, said hollow space including a side facing the transport goods, said side having a slot-shaped opening that also extends in the conveying direction, said intermediate elements comprising polyethylene and being ledge-shaped and being inserted in recesses which extend into a lower side of said hollow space in the conveying direction, two recesses of said recesses being arranged in the lower of the hollow space for intermediate elements whose distance from each other is chosen in such a way that the intermediate elements support the bolts that jut out on both sides of the side bars, said roller conveyor track further comprising an additional groove between the recesses into which the support rollers plunge while maintaining a clearance, and said roller chain being coupled to one end of the support element by means of an adapter sleeve that is placed at right angles to the conveying direction.

10. The roller conveyor track according to claim 9, wherein said conveyor track has two parallel running support elements which extend in the conveying direction and are spatially separated by transverse supports, and that the support elements lend lateral support to the transport goods.

11. A roller conveyor track comprising:
    a pair of support elements extending in a conveying direction; and
    a bolt equipped roller chain having a plurality of side bars and a plurality of bolts extending outwardly through said side bars, each of said bolts supporting a support roller for supporting workpiece carriers, said bolts being supported by a respective support element of said pair of support elements, said support rollers projecting above said side bars and said respective support element toward the workpiece carriers, said bolts being supported by intermediate elements on said respective support element, another support element of said support elements supporting a continuous flat belt, that the flat belt with its transport goods carrying strand proceeds on a ledge-shaped part, said part being mounted on said another support element and covering an aperture in said another support element, and said lower strand of the flat belt being guided back into a hollow space of said another support element.

12. A roller conveyor track comprising:

a pair of support elements extending in a conveying direction;

two parallel running support elements extending in the conveying direction and being spatially separated by transverse support s, and that the support elements lend lateral support to the transport goods; and a bolt equipped roller chain having a plurality of side bars and a plurality of bolts extending outwardly through said side bars, each of said bolts supporting a support roller for supporting workpiece carriers, said bolts being supported by a respective support element of said pair of support elements, said support rollers projecting above said side bars and said respective support element toward the workpiece carriers, said bolts being supported by intermediate elements on said respective support element, another support element of said support elements supporting a continuous flat belt, that the flat belt with its transport goods carrying strand proceeds on a ledge-shaped part, said part being mounted on said another support element and covering an aperture in said another support element, and said lower strand of the flat belt being to a hollow space of said another support element.

13. A roller conveyor track comprising:

a pair of support elements extending in a conveying direction; and a bolt equipped roller chain having a plurality of side bars and a plurality of bolts extending outwardly through said side bars, each of said bolts supporting a support roller for supporting workpiece carriers, said bolts being supported by a respective support element of said pair of support elements, said support rollers projecting above said side bars and said respective support element toward the workpiece carriers, said bolts being supported by intermediate elements on said respective support element, said bars being interconnected by said bolts, and further said support rollers jutting out from the side bars, said bolts for directly supporting said roller chain via the bolts on said respective support element and being laterally extended on both sides of the side bars.

14. The roller conveyor track as per claim 13, wherein said support rollers are positioned on said bolts between said side bars.

15. A roller conveyor track comprising:

a pair of support elements extending in a conveying direction; and a bolt equipped roller chain having a plurality of side bars and a plurality of bolts extending outwardly through said side bars, each of said bolts supporting a support roller for supporting workpiece carriers, said bolts being supported by a respective support element of said pair of support elements, said support rollers projecting above said side bars and said respective support element toward the workpiece carriers, said bolts being supported by said respective support element, and said roller chain being connected to said respective support element in order to fix said roller chain to said support element.

16. The roller conveyor track according to claim 15, wherein each of said support elements includes a hollow space extending in said conveying direction along a longitudinal direction of said support elements, said hollow space including a side facing the transport goods, said side having a slot-shaped opening that also extends in the conveying direction.

17. The roller conveyor track according to claim 15, wherein said bolts jut out from both sides of said side bars.

18. The roller conveyor track according to claim 15, further comprising a groove in said hollow space into which said support rollers plunge while maintaining a clearance.

19. The roller conveyor track according to claim 15, wherein said conveyor track has two parallel running support elements which extend in the conveying direction and are spatially separated by transverse supports, and that the support elements lend lateral support to the transport goods.

20. A roller conveyor track comprising:

a pair of support elements extending in a conveying direction;

two parallel running support elements extending in the conveying direction and are spatially separated by transverse supports, and that the support elements lend lateral support to the transport goods; and a bolt equipped roller chain having a plurality of side bars and a plurality of bolts extending outwardly through said side bars, each of said bolts supporting a support roller for supporting workpiece carriers, said bolts being supported by a respective support element of said pair of support elements, said support rollers projecting above said side bars and said respective support element toward the workpiece carriers, said bolts being supported by said respective support element, another support element of said support elements supporting a continuous flat belt, that the flat belt with its transport goods carrying strand proceeds on a ledge-shaped part, said part being mounted on said another support element and covering an aperture in said another support element, and said lower strand of the flat belt being guided back into a hollow space of said another support element.

21. The roller chain for a roller conveyor track, said roller chain comprising: a plurality of bolts; pairs of side bars being interconnected by a respective bolt of said plurality of bolts; and support rollers supported by said bolts, said rollers jutting out from said side bars, said bolts for directly supporting said roller chain via said bolts on a respective support element of the roller conveyor track and being laterally extended on both sides of the side bars.

22. The roller chain as per claim 21 wherein said support rollers are positioned on said bolts between said side bars.

23. A roller conveyor track comprising:

a pair of support elements extending in a conveying direction; and a bolt equipped roller chain having a plurality of side bars and a plurality of bolts extending outwardly through said side bars, said bolts being supported by a respective support element of said pair of support elements, said bolt equipped roller chain further having a plurality of support rollers supported by said bolts for supporting workpiece carriers, said support rollers projecting above said side bars and said respective support element toward the workpiece carriers, and said bolts for directly supporting said roller chain on said respective support element of said roller conveyor track.

24. The roller conveyor track according to claim 23, wherein said roller chain conveyor is connected to said respective support element in order to fix said roller chain to said respective support element.

25. The roller conveyor track according to claim 24, wherein said roller chain is coupled to one end of said respective support element by an adapter sleeve.

* * * * *